Nov. 7, 1939.  T. E. BRYAN  2,179,226
WELL FLOWING VALVE
Filed Aug. 24, 1936  2 Sheets-Sheet 2

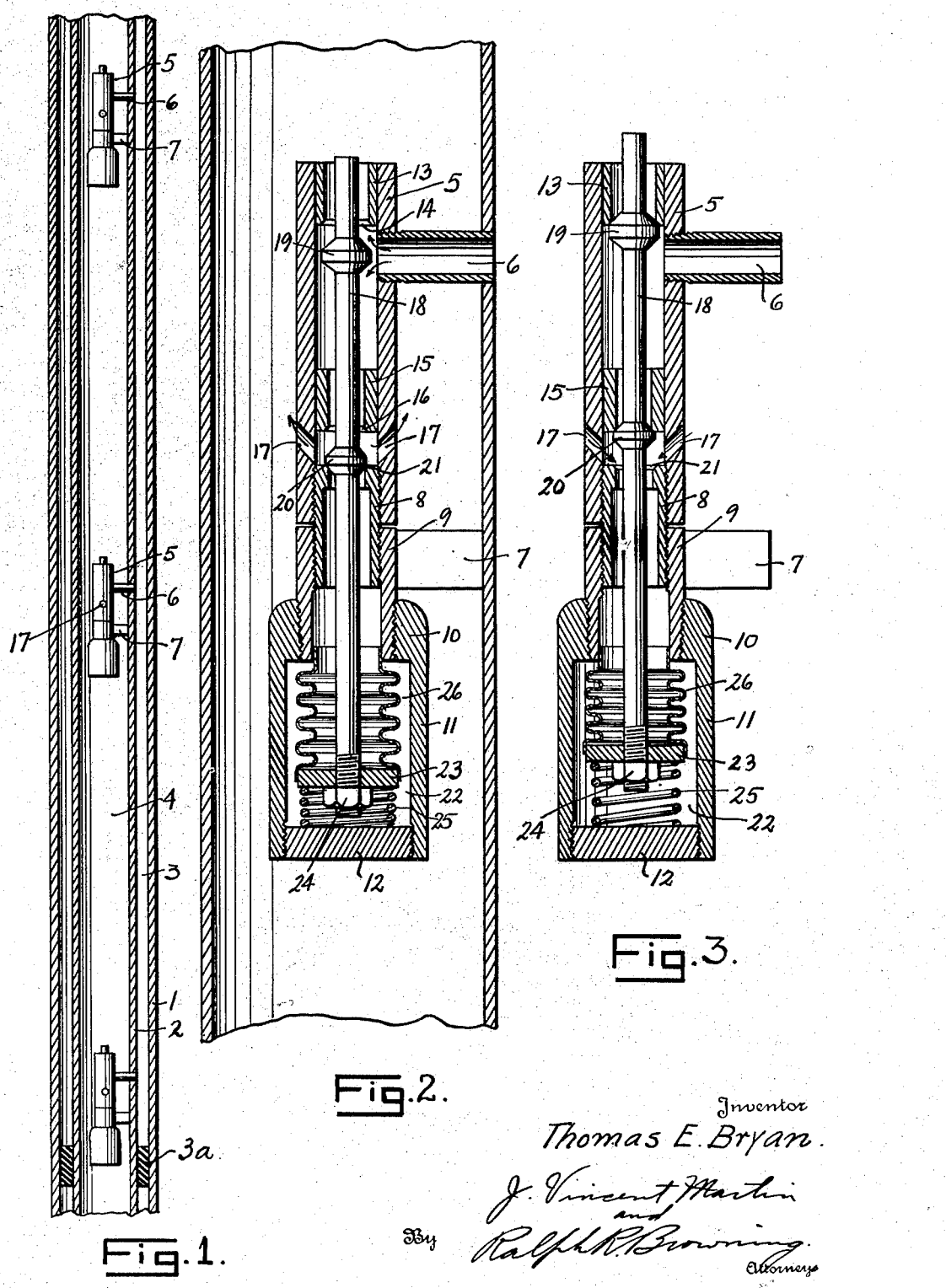

Inventor
Thomas E Bryan

Patented Nov. 7, 1939

2,179,226

UNITED STATES PATENT OFFICE 2,179,226

WELL FLOWING VALVE

Thomas E. Bryan, Oklahoma City, Okla.

Application August 24, 1936, Serial No. 97,511

12 Claims. (Cl. 103—232)

This invention relates to valves for use in oil wells or the like for the purpose of controlling the admission of gas or air into a column of fluid within the well to blast and produce such column of fluid from the well at intervals depending on the well's capacity, and make it possible to produce the well without loss of gas between heads or intervals.

It has been found that gas or air under pressure may be forced into a column of oil or other fluid within a well, and that the effect of this is to so lower the density of this column of fluid that the natural pressure existing within the producing formation of the well will be sufficient to raise the column of fluid and cause the well to flow. In such wells it is customary to provide an outer pipe or casing and an inner pipe, and to force the air or gas under pressure either into the annular space between the casing and the tubing, or into the tubing itself, and to permit the gas or air under pressure to pass through openings provided in the tubing walls and into the column of fluid which will rise in the space not occupied by the compressed gas or air.

Previously, the passage of this air or gas into the fluid column has been controlled by valves operating solely according to the relative pressures exerted within and without the tubing. More recently, certain other valves have been developed for controlling the admission of gas or air into a column of fluid, these valves being controlled by the velocity or by the flow of fluid in an upward direction. In this type of valve the valve is normally open to permit gas to pass into the fluid column when the fluid is not in motion, but when the fluid begins to move, the velocity of the fluid causes the closing of the valve and thus the shutting off of the supply of gas or air to the fluid column.

It is an object of this invention to provide a valve which may be controlled by a combination of the pressure existing in the fluid column and the difference in pressure between the pressure in the fluid column and that of the compressed air or gas.

It is a further object to provide a valve which will open suddenly upon the existence of a predetermined pressure due to the height and density of the fluid column, and which will then remain open and permit the passage of air or gas into the fluid column, the valve being held open not only by the pressure in the fluid, but also by the head due to the velocity of the incoming gas or air. It is an object that this valve shall thus remain open until the pressure in the fluid at the valve has been reduced by a predetermined amount, at which time the valve will suddenly close and will not again open until the pressure in the fluid at the valve has again increased to the predetermined value.

With the foregoing and other objects in view, this invention contemplates a structure including the various parts and combinations illustrated in the accompanying drawings and set forth in the following description, it being understood, however, that the accompanying drawings and the following description are by way of illustration and example only, and are not to be taken as in any way limiting the spirit or scope of this invention. Such limitation is to be only by the prior art, and by the terms of the appended claims.

Referring now more particularly to the drawings in which like numerals indicate corresponding parts throughout:

Fig. 1 is a view in vertical cross section illustrating the application of the valves constructed in accordance with this invention to an oil well or the like.

Fig. 2 is an enlarged vertical cross section of a length of tubing having therein a valve constructed in accordance with this invention, said valve being also shown in vertical cross section.

Fig. 3 is a similar view of the valve illustrated in Fig. 2, the valve being shown in closed position, and the tubing being omitted.

Figures 4, 5:
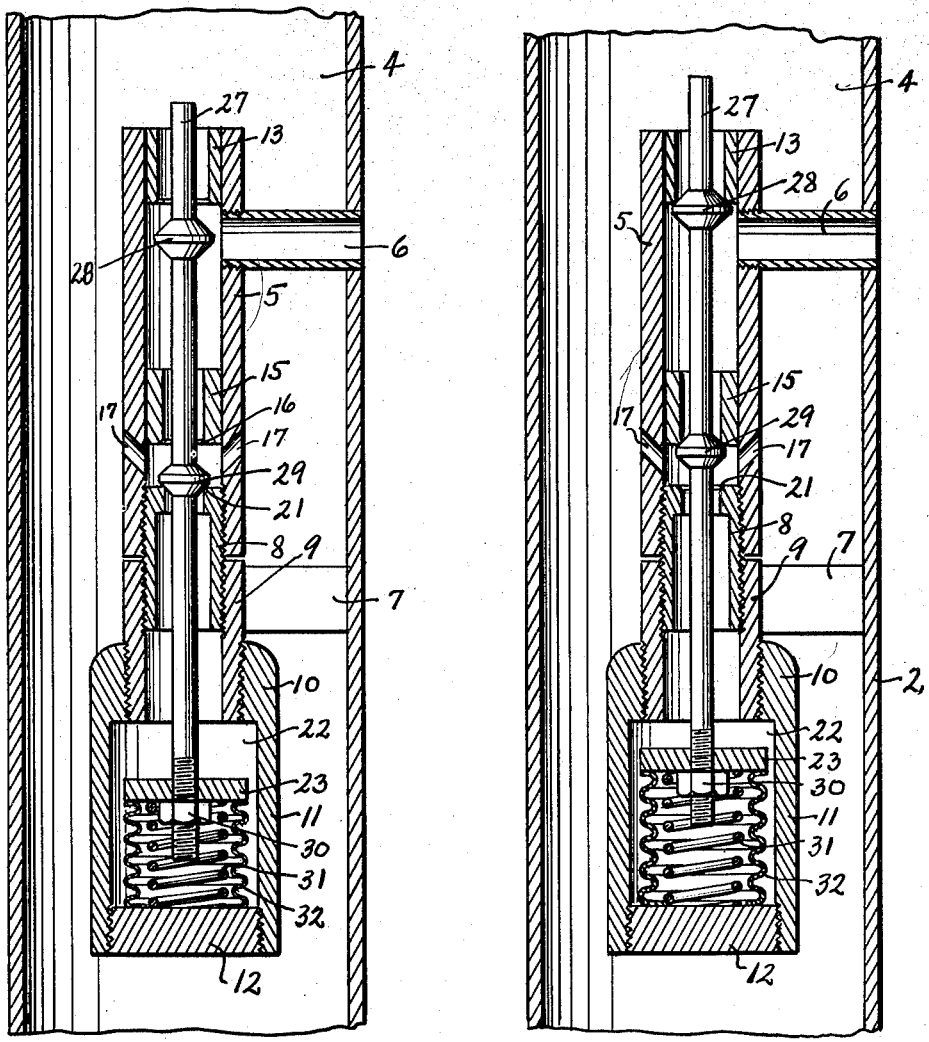
Fig. 4 is a view similar to Fig. 2 showing a slightly modified form of valve.
Fig. 5 is a view similar to Fig. 4 but illustrating the valve in closed position.

In Fig. 1, the numeral 1 indicates the casing of an oil well, and 2 the tubing employed therein. Between the casing and the tubing there is formed an annular space or chamber 3, and within the tubing the chamber 4. The lower end of the annular chamber 3 is preferably sealed off by means of a packer 3a, which may be of conventional form. The valves 5, which in this instance are positioned for admitting the gas or air under pressure from the space 3 into the space 4, are positioned at intervals along the tubing. Each of these valves 5 is connected by means of a nipple 6 to the wall of the tubing for the purpose of affording communication between the chamber 3 and the interior of the valve member 5. An additional support 7 may be provided if desired.

The lower end of the valve member 5 which is of tubular form is internally threaded to receive a nipple 8, and a second nipple 9 which carries the support 7 is threadedly engaged with the lower end of the nipple 8. The nipple 9 is externally threaded at its lower end for the purpose of receiving the reduced upper end 10 of the housing 11, this housing being closed at its lower end by a plug 12 which is threaded therein.

Adjacent its upper end, the tubular valve member 5 is provided with an internal liner or sleeve 13 formed with a valve seat 14 at its lower end. A second such liner having a somewhat smaller opening therein is provided below the nipple 6, and illustrated at 15, this liner having a seat 16 at its lower end. The member 5 has upwardly inclined openings 17 through its walls just below the valve seat 16.

Passing through the assembly which has just been described is a valve stem 18 having valve elements 19 and 20 thereon positioned to simultaneously engage the valve seats 14 and 16, respectively. As shown, the upper valve element 19 is larger than the lower valve element 20. The upper end of the nipple 8 is also provided with a valve seat 21 adapted to receive the valve element 20 when the valve stem 18 is moved to its lowermost position.

Located within the chamber 22 formed by the member 11 is a disc 23 fixedly mounted on the lower end of the valve stem 18 and locked in place by means of a nut 24 or the like. A compression spring 25 is positioned beneath this disc to constantly urge it upwardly, and a diaphragm 26 is sealed about the outer edge of the disc at its lower end and within the lower end of the nipple 9 at its upper end so that any pressure existing outside of the valve when the valve heads are held in closed position by the spring 25 will pass inwardly through the openings 17, and will be exerted downwardly upon the diaphragm 26 and the disc 23.

It will readily be seen that the valve is held in closed position by the spring 25 and by the excess of the force exerted by the gas on the upper valve element 19 over that exerted on the lower element 20. It will be further seen that when the hydrostatic pressure in the column of oil in which such a valve may be located reaches a predetermined value, the pressure of the oil will cause the disc 23 to move downwardly compressing the spring 25 and moving the valve elements 19 and 20 away from their respective seats 14 and 16. This movement will take place suddenly due to the fact that as soon as the valve starts to open the element 19 will move to a position in front of the end of the nipple 6 and the gas will no longer exert as great a closing force on the valve. The valve will therefore move to its extreme lower position with the element 20 seated against the seat 21. This traps a certain amount of oil in the chamber below the seat 21 at the pressure existing in the oil when the valve opened, and after the removal of the closing effect of the gas this, together with the pressure existing in the fluid column, is more than sufficient to hold the valve open. Air or gas under pressure will then be admitted through the nipple 6 and will pass by the valve elements 19 and 20 and out through the upper end of the tubing 5 and through the openings 17. This downward velocity of the gas through the sleeve 15 and out through the openings 17 will exert an appreciable force upon the valve element 20, and this force working with the pressure existing in the column of fluid causes this element to remain seated against the seat 21, and permits continuous passage of gas into the oil or fluid column. It is contemplated that gas shall be admitted by this valve in sufficient volume to blast the oil from the well without mixing with the oil to the extent it would if admitted more slowly. When the fluid column has been raised by this admission of gas and the pressure adjacent the valve is reduced, the spring 25 below the disc 23 will force said disc upwardly, thus moving the valve elements 19 and 20 upwardly to shut off the supply of gas. This movement will also take place suddenly due to the fact that as soon as upward movement of the valve elements begins, the incoming gas passing out through the upper end of the member 5, will exert an increased effect on the element 19 tending to raise both elements against their seats.

Referring to the form illustrated in Figs. 4 and 5, it is to be noted that the valve stem 27 carries two valve elements the same as in the previous instance, and that the upper and lower valve elements 28 and 29 are of substantially the same size as those shown in Figs. 2 and 3. The disc 23 carried by the lower end of the valve stem 27 is of the same form as the disc 23 of Figs. 2 and 3, and is similarly secured in place by means of a nut 30. A spring 31 similar to the spring 25 is employed below this disc and normally urges the valve elements to their upper seated position. The diaphragm 26, however, is in this form replaced with a diaphragm 32 which is sealed about the outer edge portions of the disc 23 and extends downwardly surrounding the spring 31, its lower end being sealed to the inner surface of the plug 12.

In operation, this second form is substantially the same as the first form. It is to be understood that the relative sizes of the upper and lower valve elements may be whatever desired for the purpose of obtaining the desired influence of the pressure of the gas or air upon the opening or closing of the valve. With this in view, it will be understood that the valve element 28 may be made of any size desired with respect to the size of the valve element 29 for the purpose of securing the desired result. It is also noted that the open position of the elements 19 and 28 may be adjusted with respect to the opening from the nipple 6 and the respective valve seats, to vary the closing effect of the incoming gas on these elements as desired.

Referring to Fig. 1, a number of the valves hereinbefore described are shown spaced vertically from each other within the tubing of an oil well. However, this valve is particularly designed and is most suitable for use as the lowest of these valves, and it will be understood that various types of flow valves may be substituted for the upper of these valves, if this is found desirable, and in certain cases it will be found that one valve will be sufficient to raise the column of oil entirely out of the well.

From the foregoing, it will be apparent that a means has been set forth which is simple and inexpensive in construction, and which is fully capable of carrying out and accomplishing all of the objects sought by this invention:

I claim:

1. In a tubing flow valve structure, for use in a string of tubing, a partially balanced valve supported by said tubing for controlling communication between the interior and the exterior of said tubing, and means subjected to the hydrostatic pressure within the tubing opening said partially balanced valve when said hydrostatic pressure exceeds a predetermined value, and a part of said valve subjected to the velocity head due to flow through said valve into the tubing when said valve is open and other means retaining the said valve in normally closed position.

2. In a tubing flow valve structure, a string of tubing, a partially balanced valve supported by the said tubing for controlling communication between the interior and exterior of said tubing, spring means normally urging said valve into closed position, and means independent of the pressure outside the tubing opening said partially balanced valve when the internal pressure of the said tubing exceeds a predetermined value.

3. In a tubing flow valve structure, a string of tubing, a valve for controlling communication between the interior and the exterior of said tubing, means subjected to the pressure within the tubing for opening said valve when said pressure exceeds a predetermined value, other means comprising a part of said valve subjected to the pressure without the tubing for resisting opening movement of said valve in proportion to the pressure existing outside of said tubing and means effecting the closing of the said valve when the said last named pressure reaches a peak velocity therethrough and means retaining the said valve in closed position.

4. In a tubing flow valve structure, a string of tubing, a valve connected in the said tubing for controlling communication between the interior and the exterior of said tubing, means subjected to the pressure within the tubing for opening said valve when said pressure exceeds a predetermined value, means forming a part of said valve subjected to the pressure without the tubing for resisting opening movement of said valve in proportion to the pressure existing outside of said tubing and means effecting the closing of the said valve depending upon the reduction of the said first named pressure and means retaining the said valve normally in closed position.

5. In a device of the type described, a valve for controlling admission of an aerating medium under pressure into a column of fluid, means connected with said valve and actuated by a predetermined head of said column to open said valve, and means connected to said first means and subjected to the pressure of the aerating fluid when said valve is closed to retard the opening of said valve by said first mentioned means.

6. In a device of the type described, a valve for controlling admission of an aerating medium under pressure into a column of fluid, means connected with said valve and actuated by a predetermined head of said column to open said valve, and means connected to said first means and subjected to the pressure of the aerating fluid when said valve is closed to retard the opening of said valve by said first mentioned means, said last mentioned means being movable, upon opening of said valve, to reduce the effect of said pressure of the aerating fluid thereon.

7. In a device of the type described, a valve for controlling admission of an aerating medium under pressure into a column of fluid, means connected to said valve and actuated by a predetermined head of said column to open said valve, means connected to said first means and subjected to the pressure of the aerating fluid when said valve is closed to retard the opening of said valve by said first mentioned means, and means for normally urging said valve toward closed position.

8. In a device for controlling the aeration of a column of fluid within a tubing, a valve mechanism within the tubing controlling admission of the aerating fluid thereto, said valve mechanism comprising a valve, means normally urging said valve toward closed position, pressure operated means subject to the pressure of said column of fluid for opening said valve when said pressure exceeds a predetermined value, and pressure operated means subject to the pressure of the aerating fluid for assisting in holding said valve shut, said last means being substantially inactive when said valve is open.

9. In a device for controlling the aeration of a column of fluid within a tubing, a balanced valve for controlling the admission of an aerating fluid into said column and having a valve stem, spring means normally urging said valve stem in a direction to close said valve, a pressure actuated member connected to said valve stem and exposed to the pressure of said column of fluid to move said valve stem in a direction to open said valve when said pressure exceeds a predetermined value, and means on said valve stem adapted to be acted upon by said aerating fluid under pressure when said valve is closed to assist in maintaining said valve in closed position.

10. In a device for controlling the aeration of a column of fluid within a tubing, a valve housing for a pair of downwardly facing valve seats within the upper end of said housing, said housing having an inlet opening intermediate said valve seats in communication with a source of aerating fluid under pressure, a valve stem passing through said housing, a pair of spaced valve elements thereon adapted to seat upon said valve seats, said housing having an upwardly inclined opening just below the lower of said valve seats, said valve housing having a chamber below said outlet opening, a disc on said valve stem within said chamber, an expansible diaphragm sealing the edges of said disc to the walls of said chamber, and a spring below said disc for urging said valve elements against their seats, whereby the pressure of said column of fluid will act upon said disc and diaphragm through said outlet opening to move said valve elements away from the seats when said pressure exceeds a predetermined value, and whereby when said valve heads are away from their seats aerating fluid will be admitted to said column past said valve seats, and that passing the lower seat will impinge with a nozzle effect upon the lower valve head to assist in holding the valve heads away from their seats.

11. In a device for controlling the aeration of a column of fluid within a tubing, a valve housing, a pair of spaced downwardly facing valve seats within the upper end of said housing, said housing having an inlet opening intermediate said valve seats in communication with a source of aerating fluid under pressure, a valve stem passing through said housing, a pair of spaced valve elements thereon of unequal size adapted to seat upon said valve seats, the open position of one of said elements being substantially opposite said inlet opening, said housing having an upwardly inclined outlet opening just below the lower of said valve seats, said valve housing having a chamber below said outlet opening, a disc on said valve stem within said chamber, an expansible diaphragm sealing the edges of said disc to the walls of said chamber, and a spring below said disc for urging said valve heads against their seats, whereby the pressure of said column of fluid will act upon said disc and diaphragm through said outlet opening to move said valve heads away from their seats when said pressure exceeds a predetermined value, said value being dependent partially upon the pressure of the aerating fluid due to the inequality in size of said valve elements, and whereby when said valve elements are seated, the pressure of the aerating fluid will tend to keep them seated and whereby when they are unseated, the incoming aerating fluid will exert substantially no seating effect.

12. In a device for controlling the aeration of a column of fluid within a tubing, a valve housing, a pair of spaced downwardly facing valve seats within said housing, said housing having an inlet opening intermediate said valve seats in connection with a source of aerating fluid under pressure, a valve stem passing through said housing, a pair of spaced valve elements thereon of unequal size adapted to seat upon said valve seats, the open position of one of said elements being substantially opposite said inlet opening, means subjected to the hydrostatic pressure within the tubing and connected to said valve stem for opening said valve when said hydrostatic pressure exceeds a predetermined value, said value being dependent partially upon the pressure of the aerating fluid due to the inequality in the size of said valve elements, and whereby when said valve elements are seated the pressure of the aerating fluid will tend to keep them seated, and whereby when they are unseated the incoming aerating fluid will exert substantially no seating effect, and will exert a force to maintain the valve elements in unseated position until the pressure within the tubing falls to a point substantially lower than the pressure existing when the valve elements were unseated, whereby the valve will act intermittently.

THOMAS E. BRYAN.